Figure 1:
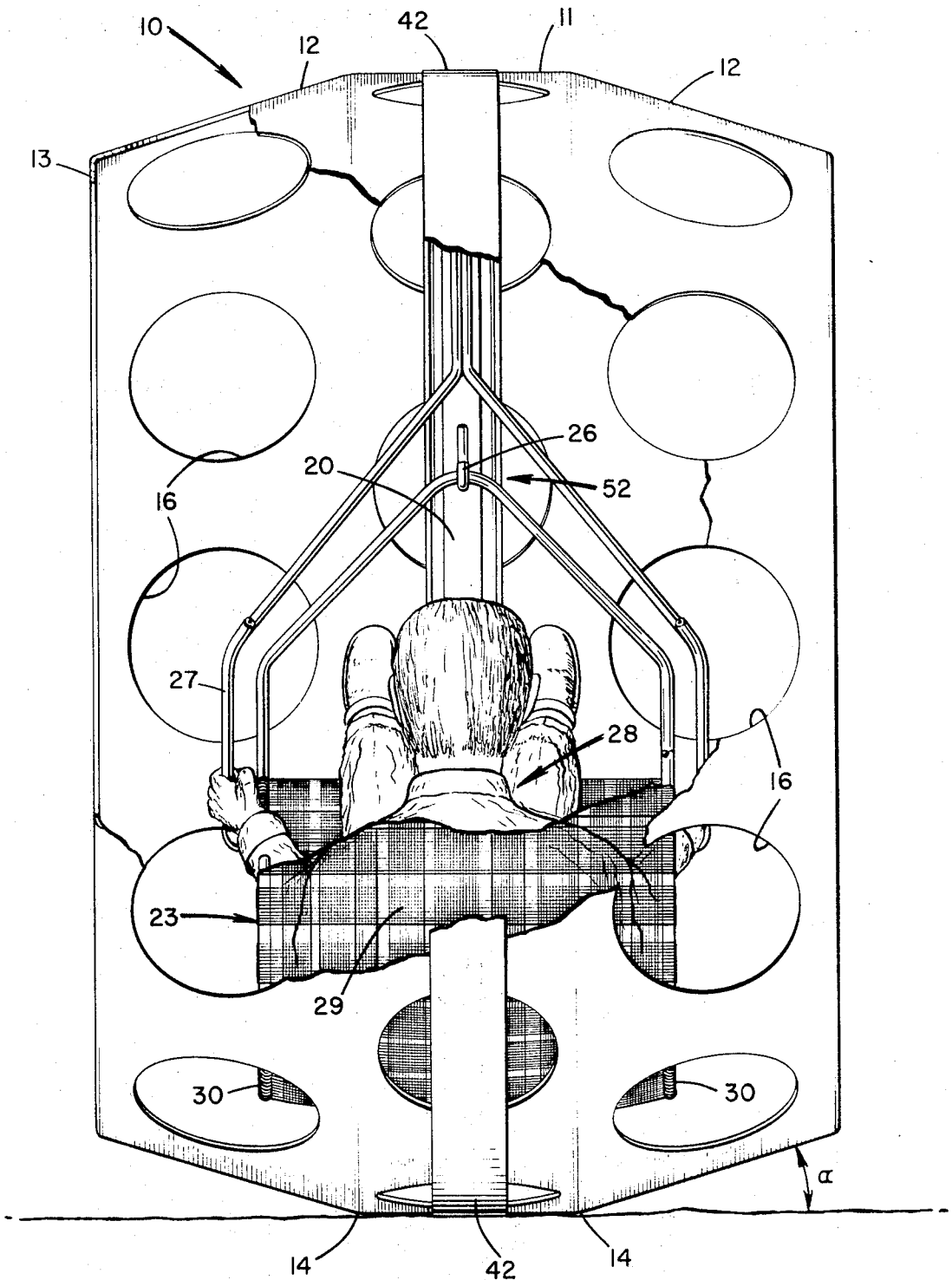

United States Patent [19]

Bourne

[11] 3,777,835
[45] Dec. 11, 1973

[54] ONE-WHEEL VEHICLE

[76] Inventor: Richard Curtis Bourne, 4401 S. 27th St., Apt. F13, Lincoln, Nebr.

[22] Filed: Jan. 14, 1972

[21] Appl. No.: 217,796

[52] U.S. Cl.................................. 180/10, 280/207
[51] Int. Cl................................................ B62k 1/00
[58] Field of Search....................... 180/1 R, 10, 21; 280/11.24, 205, 206, 207; 305/7

[56] References Cited
UNITED STATES PATENTS

| | | | |
|---|---|---|---|
| 2,009,904 | 7/1935 | Purves | 180/1 R |
| 3,260,324 | 7/1966 | Suarez | 180/10 |
| 3,338,593 | 8/1967 | Gehring | 280/206 |

FOREIGN PATENTS OR APPLICATIONS

| | | | |
|---|---|---|---|
| 136,073 | 12/1933 | Austria | 180/10 |
| 275,647 | 7/1928 | Great Britain | 180/10 |
| 355,149 | 6/1922 | Germany | 280/205 |
| 474,483 | 9/1952 | Italy | 180/10 |
| 573,801 | 6/1924 | France | 280/207 |

Primary Examiner—Richard J. Johnson
Assistant Examiner—Reinhard Eisenzopf
Attorney—Phillip J. Kardis

[57] ABSTRACT

A one-wheel vehicle having an outer hoop, an inner carriage movably mounted inside said outer hoop, engine means for driving said inner carriage in a counterclockwise direction upon said outer hoop to impart forward movement of the vehicle, steering means comprising a seat supporting the occupant in a semi-reclining position movably suspended from said inner carriage and being pivotal in a direction transverse to the movement of said vehicle and means for swinging said seat in a pendulum-like movement. In a further aspect hereof, said outer hoop comprises a cylinder having a truncated cone attached to each end thereof thereby defining three stable rest positions for said vehicle. In a still further aspect hereof, said outer hoop comprises two separate hoops spaced apart having an outer band extending threraround wider than the space between said two hoops and being fastened to each, said spacing providing a track guiding said inner carriage upon said band.

8 Claims, 4 Drawing Figures

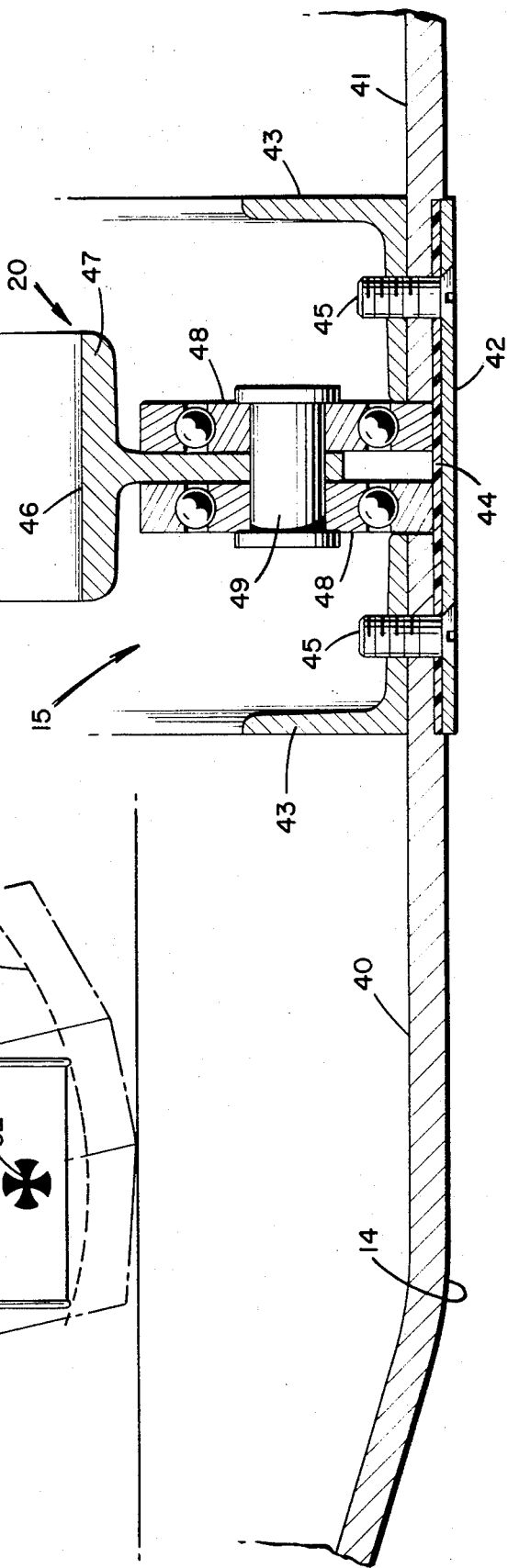
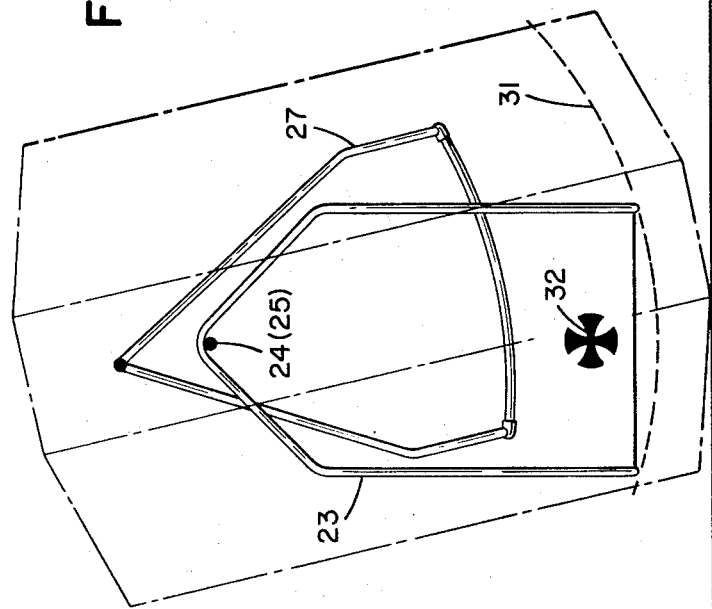

ONE-WHEEL VEHICLE

This invention relates to new and useful improvements in one-wheeled cycles or monocycles.

BACKGROUND OF THE INVENTION

Since the early days of the bicycle, men have experimented with one-wheeled cycles in which the operator rides within the wheel. Such schemes seemed to promise the advantages of lower cost (fewer parts) and greater safety, with the operator nearer the ground and protected by the wheel. With the advent of motor-driven bicycles, motorized one-wheeled cycles (monocycles) appeared as well. As with their unpowered predecessors, these vehicles could not compete with their two wheeled rivals. Because of their larger inertia and absence of a pivoted wheel, they were much more difficult to alter from a straight course. The absence of a second point of contact with the ground meant reduced leverage for power and braking; gradual hills and stops were the rule.

These problems particularly limited the success of the one-wheeled class of vehicles at a time when people sought rapid and reliable transportation along often heavily traveled path and roadway systems requiring frequent stops and right-angle turns. In the context of reasonably level and paved roadbeds, the potentially better ride of a single large wheel was of no advantage.

In the last few years, however, several new types of vehicles have emerged with which an improved one-wheeled vehicle could possibly compete. Among these are the snowmobile, the trailbike, the dune buggy, and the ATV (all-terrain vehicle). All of these are recreational, off-the-road (OTR) vehicles, and most are quite expensive.

In the prior art, one-wheeled vehicles have been attempted as bicycle or motor cycle substitutes for path and roadway applications. Two examples of such devices are those described in patents U.K. 275,647 (Cislaghi, 1928) and U.S. Pat. No. 3,260,324 (Suarez, 1966). Both of these vehicles use a narrow wheel or tire, the inside of which provides a ride surface for an inner carriage. In both cases, the rider straddles a conventional bicycle seat, which does not position him low enough in the vehicle for optimum performance. The earlier patent describes a lever system which permits the operator to adjust the position of the engine "crosswise" in the vehicle for steering, but since the weight of the engine is small relative to the weight of the occupant and since the lever system allows relatively minor movement of the engine, the total steering effect is so limited that it alone could not be employed to provide total vehicle control. In the Suarez patent, steering is principally effected by the driver leaning his upper torso out of the plane of the rim while sitting on a seat fixed to the carriage. Another patent, U.S. Pat. No. 2,009,904 (Purves, 1935) describes a single axis vehicle of spherical form with means for moving the inner track within the outer shell for steering, but the means are cumbersome and counterproductive, to the extent that the upper half of the carriage is shifted in the direction opposite that in which the vehicle is meant to be turned. The spherical outer form prevents the vehicle from having any upright positions of stability. A more recent (unpowered) single-axis device described in U.S. Pat. No. 3,338,593 (Gehring, 1967) utilizes a single wide cylinder, giving it upright stability, but no mechanical means is provided to alter the location of the center of mass for turning.

The object of the invention being claimed is to provide to the public a lower cost, more versatile, and more enjoyable off-the-road vehicle. The large one-wheeled vehicle, wide enough to provide considerable bearing area, traverses sand, snow or high fields with ease. Equipped with special flotation hoops, the device travels through water like a paddle wheel. An additional objective is to provide a safer recreational vehicle, one which will not trap the occupant beneath it, or land upon the occupant, in the event an accident occurs. A further objective is to provide a more comfortable off-the-road vehicle, with reduced chance of spinal damage as compared to presently marketed vehicles.

Thus, the present invention relates to an all-terrain vehicle rather than one in competition with conventional roadway vehicles. The outer hoop is wide for traction, passenger protection, and to provide several stable rest positions. The passenger carrier is not a chair upon which the occupant is perched, but rather is a "chaise" in which the driver assumes a substantially reclining position, for greater comfort and to lower the center of mass to improve performance. In addition, the chaise is hung from two or more points above the center of the carriage, and the carriage is equipped with handholds so that the occupant may swing his own weight back and forth transverse to the direction of travel, with the objective of shifting the center of mass sufficiently to negotiate close radii turns, as well as to permit rapid reaction against unstabilizing forces. The carriage may, of course, be hung from one point; however, it is then difficult to confine the swinging to only the lateral direction thereby possibly causing safety problems.

Figure 2:
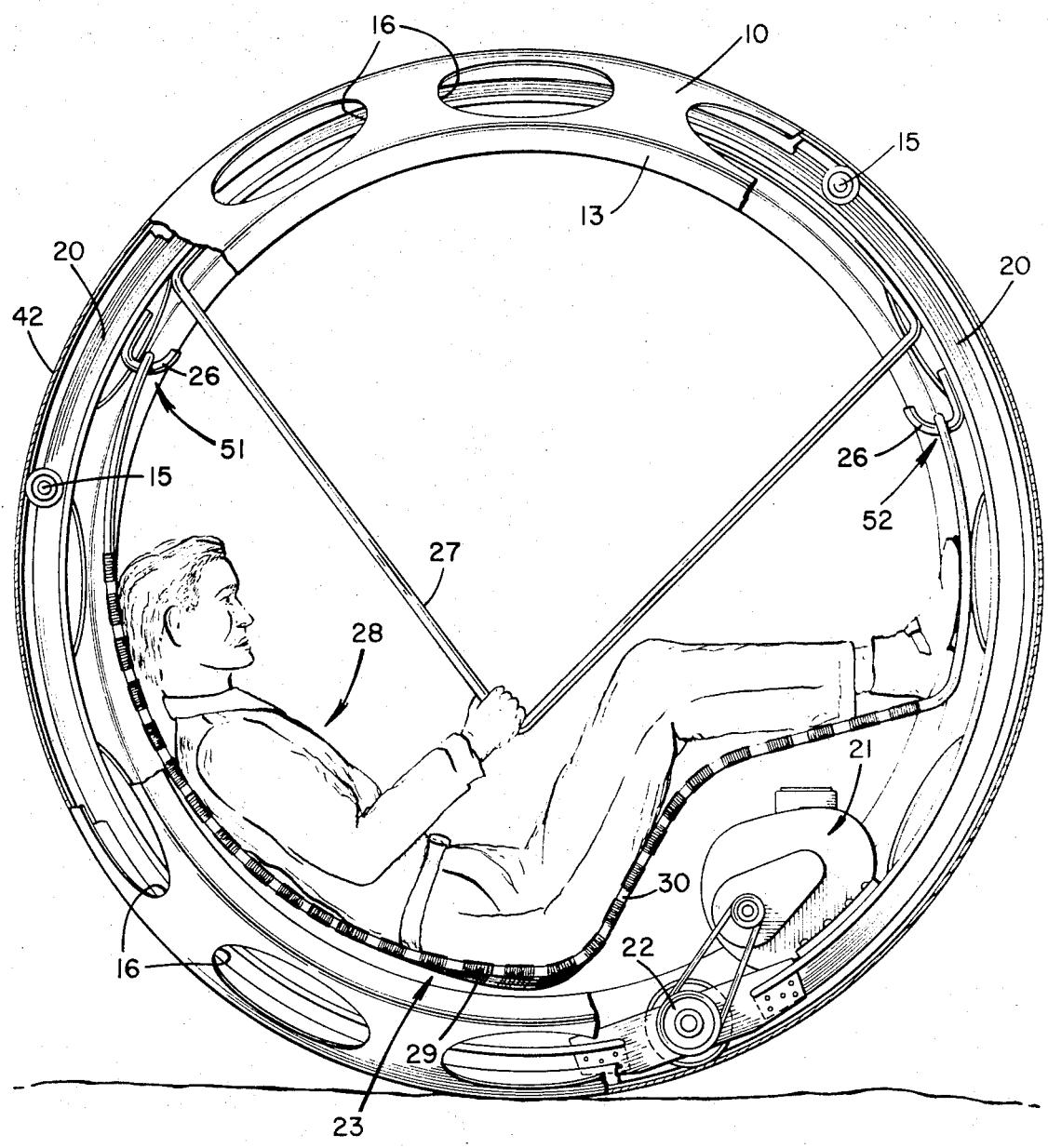

In describing the invention in detail, reference will be made to the accompanying drawings in which the same or corresponding parts throughout the several views are designated by the same numeral and in which:

FIG. 1 is a rear elevational view partially cut-away;
FIG. 2 is a side elevational view partially cut-away;
FIG. 3 is a rear schematic; and
FIG. 4 is a cross-sectional view of the arrangement of the inner carriage and outer hoop.

The one-wheel vehicle is comprised of an outer hoop 10 and an inner carriage shown as 20 in FIGS. 1 and 2. The inner carriage has rigidly mounted thereon a motor shown generally as 21 in FIG. 2 operatively connected to the outer hoop by means of drive gear 22. The motor may be any type, for example, a suitable engine is a Clinton E65CW, two cycle horizontal shaft engine sold by the Clinton Engines Corporation of Maqueketa, Ia. Inner carriage 20 is movably mounted inside said outer hoop by means of said drive gear 22 and two bearings shown as 15 in FIG. 2. The two bearings and the drive wheel are preferably equally spaced, that is, 120° apart. Of course, more bearings may be used as desired. Hence, inner carriage 20 need not be a full circle but must be of such circumferential size to maintain the operative connection of the inner carriage with the outer hoop, particularly where rough terrain is being traversed, and to provide adequate support for the seat shown generally as 23. Also, the seat 23 may be designed for one or more passengers.

As the inner carriage 20 is driven forward by the motor 21 upon outer hoop 10, the center of gravity of the whole vehicle is displaced forward, and the outer hoop 10 is thus caused to roll forward, giving continuous forward motion to the vehicle, any lateral displacement of the center of gravity of the inner carriage 20 and/or its borne load will cause lateral tilting of the outer hoop 10 which, when accompanying a forward movement, causes a turning of the vehicle. Such an effect may be employed to allow the vehicle to be steered by passengers and the means for doing so will be described more fully hereinafter. It will be observed that the center of gravity of the vehicle is always below the center of the (axis of vehicle) outer hoop.

It will be seen that the outer hoop 10 of the one-wheel vehicle comprises a cylindrical section 11 having truncated cones 12 attached to each end and defining three stable rest positions for said vehicle. The height of each said truncated cone is preferably greater than the height of said cylinder and the ratio therebetween can be from 11:10 to 13:10 more particularly approximately 6:5. Preferably the outer hoop is wide enough to completely confine the body of the occupant within its peripheral edges, more preferably from 30 to 40 inches wide. The end of each truncated cone terminates in an inwardly extending portion 13 which is provided in order to increase the strength of the outer hoop.

The outer hoop is provided with a number of holes 16 for traction and visibility. The holes are placed in each of the cone portions and in the cylinder portion and may, for example, constitute approximately fifty per-cent of the total outer surface area of the outer hoop. In a preferred embodiment, the outer hoop is constructed of fiberglass because of its high strength to weight ratio, although any suitable material may be employed. Moreover, it is desirable to minimize the weight ratio of the outer hoop to the inner carriage assembly.

The angle alpha in FIG. 1 represents the angle between the plane of the side of the truncated cone 12 with the imaginary extension of the cylinder. The height of the untruncated or full cone represents the turning radius of the outer hoop. In a preferred embodiment, this distance is 8 feet and 2 inches which necessitates an angle alpha of approximately 17°. Alpha may vary from 15° to 20°, more preferably about 17° depending upon the desired turning radius for the vehicle.

It will be appreciated that the above represents the minimum turning radius. Even though the outer surfaces of the cylinder 11 and the truncated cones 12 are flat, larger radii turns may be easily negotiated by riding the curvature of inter-section 14. One must realize that the vehicle is primarily intended for surfaces such as earth, sand, snow and the like rather than paved highways. Hence even though said curvature extends for a lineal distance of only from about three-quarters of an inch to an inch, the full range of operation between straight and the minimum turning radius is possible.

At rest, the vehicle will be stable resting on the outer surface of cylinder 11 or either of said cones 12. In order to turn the vehicle, the center of mass of same must be laterally displaced beyond the edge of the cylinder 11. As described above, the intersection of the cylinder and the truncated cones is not a sharp angle but is rather curved over a length of approximately 3/4 of an inch to an inch which also provides structural strength therefor.

The seat 23 is pivotally suspended from two points 51 and 52 which are rigidly connected to inner carriage 20. Such connections can be in the form of a U-shaped hanger 26 which is rigidly fastened to inner carriage 20, and supports the seat 23. Said hanger is sized such that the seat may swing freely, from side to side without binding.

As shown in FIG. 3, the seat is pivotable about the axis connecting points 24 and 25. Rigidly connected to the inner carriage is a handle-bar shown as 27. As shown in FIGS. 2 and 3, the occupant shown generally as 28 rests on a support 29 between the tubular members 30 of said seat in a semi-reclining position. During the rotation of the outer hoop, the occupant lies in said semi-reclining position with his hands on the handle-bar. The occupant is thus able to transversely move the sling either to his right or left depending upon the direction in which he wishes the vehicle to turn. As can be seen from FIG. 3, the points 24 and 25 are above the center of the circle defined by the outer hoop 10. Several considerations control the placing of the points 24 and 25. First, the points are positioned high enough on the innercarriage so that the lateral displacement of said seat occurs along a line depicted as 31 in FIG. 3. It can be seen that this line is approximately an equal distance from the bottom of said cylinder and the bottom of said truncated cones. The result of this is that the center of mass of the occupant shown as 32 in FIG. 3 remains about an equal distance above the point of contact between the vehicle and the ground during all phases of the turn, thereby maximizing climbing ability particularly during a turning maneuver.

As can be seen from FIG. 4, the outer hoop is comprised of two halves 40 and 41 which are joined together in the following manner. A band 42, preferably of stainless steel, more preferably 1/16 × 4 inches and 16 gauge, is palced around the halves of said outer hoop. Immediately adjacent on the inside of said outer hoop are two angles indicated as 43, preferably of aluminum. The angles are preferably 1 ¼ × 1 ½ × ⅛. In between the band and the halves of the outer hoop is placed a neoprene gasket shown as 44. The angles, hoop halves and band are held together by screws shown as 45. There can be used whatever number of screws is deemed desirable to provide the proper structural strength. In one embodiment, approximately 48 equally spaced screws are provided, 24 for each half of the outer hoop. The inner carriage is defined by surface 46 of the "T" 47 which is preferably 2 × 2 × ¼ inches and made of aluminum. This T is operatively connected through ballbearings 48 through shaft 49, preferably of steel, to make contact with the neoprene gasket 44. On the surface 46 are rigidly connected the supports for the seat 23 as previously discussed.

What is claimed is:

1. In a one-wheel vehicle having an outer hoop, an inner carriage movably mounted inside and borne by said outer hoop, means for driving said inner-carriage upon said outer hoop and displacing the vehicle center-of-mass forward of the point of contact with the ground for thereby causing rolling motion of said outerhoop in the direction of the displacement, and steering means comprising means for displacing the center-of-mass laterally of the direction of movement, the improvement comprising said steering means comprising a seat for supporting the occupant, said seat being pivotally suspended from said inner-carriage above the axis of rotation of said vehicle for pendulum-like movement, and means for swinging said seat.

2. In a one-wheel vehicle according to claim 1, the improvement further comprising an outer hoop comprising two halves spaced apart, an outer band externally coaxial with said two halves, said band being fixedly connected to each of said two halves providing a track defined by the edges of said two halves and the internal surface of said band, said track bearing and guiding said inner carriage.

3. In a one-wheel vehicle according to claim 2, said driving means comprising an engine means operatively engaging said track.

4. In a one-wheel vehicle according to calim 1, said outer hoop comprising a cylinder having a truncated cone attached to each end thereof thereby defining three stable rest positions for said vehicle.

5. In a one-wheel vehicle according to claim 4, said outer hoop comprising two halves spaced apart, an outer band externally coaxial with said two halves, said band being fixedly connected to each of said two halves providing a track defined by the edges of said two halves and the internal surface of said band, said track bearing and guiding said inner carriage.

6. In a one-wheel vehicle according to claim 5, said driving means comprising an engine means operatively engaging said track.

7. A one-wheel vehicle according to claim 1, wherein said outer hoop is wide enough to confine the body of the occupant within its peripheral edges.

8. A one-wheel vehicle according to claim 1 wherein said outer hoop is wider than said seat for thereby confining the body of the occupant within its peripheral edges.

* * * * *